United States Patent [19]

Kramer

[11] Patent Number: 4,564,041

[45] Date of Patent: Jan. 14, 1986

[54] QUICK DISCONNECT COUPLING DEVICE

[75] Inventor: Dean C. Kramer, Mason City, Iowa

[73] Assignee: Martinson Manufacturing Company, Inc., Sheffield, Iowa

[21] Appl. No.: 644,224

[22] Filed: Aug. 27, 1984

Related U.S. Application Data

[63] Continuation-in-part of Ser. No. 547,328, Oct. 31, 1983, abandoned.

[51] Int. Cl.[4] .......................... F16L 5/00; F04B 39/14
[52] U.S. Cl. .................................... 137/565; 137/315; 285/24; 285/325; 417/360
[58] Field of Search .................. 285/325, 67, 24, 27; 137/565, 315; 251/360, 148, 151; 417/360

[56] References Cited

U.S. PATENT DOCUMENTS

| | | | |
|---|---|---|---|
| 653,143 | 7/1900 | Martin | 285/67 |
| 686,571 | 11/1901 | Wilson | 285/67 |
| 749,496 | 1/1904 | Patterson et al. | 285/67 |
| 3,260,539 | 7/1966 | Herron | 285/24 |
| 3,365,215 | 1/1968 | Arzt et al. | 285/325 |
| 3,771,915 | 11/1973 | Back | 417/360 |
| 3,851,898 | 12/1974 | Ihara | 285/325 |
| 3,880,553 | 4/1975 | Wolford et al. | 417/360 |
| 4,308,000 | 12/1981 | Oakes | 417/360 |

*Primary Examiner*—A. Michael Chambers
*Attorney, Agent, or Firm*—Herman H. Bains

[57] ABSTRACT

A quick disconnect coupling device for a sump pump includes a pair of vertically disposed coupling members formed of a chemically inert metallic material and coupling the discharge outlet of the sump pump to the outlet pipe for the sump. In one embodiment of the invention, each coupling member engages and is vertically slidable on vertical guide rails positioned within the sump. One coupling member is provided with vertical guide ways for receiving guides on the other coupling member which permits ready disconnection and ready reconnection of the coupling members when the sump pump is raised and lowered.

5 Claims, 6 Drawing Figures

U.S. Patent   Jan. 14, 1986   Sheet 2 of 2   4,564,041
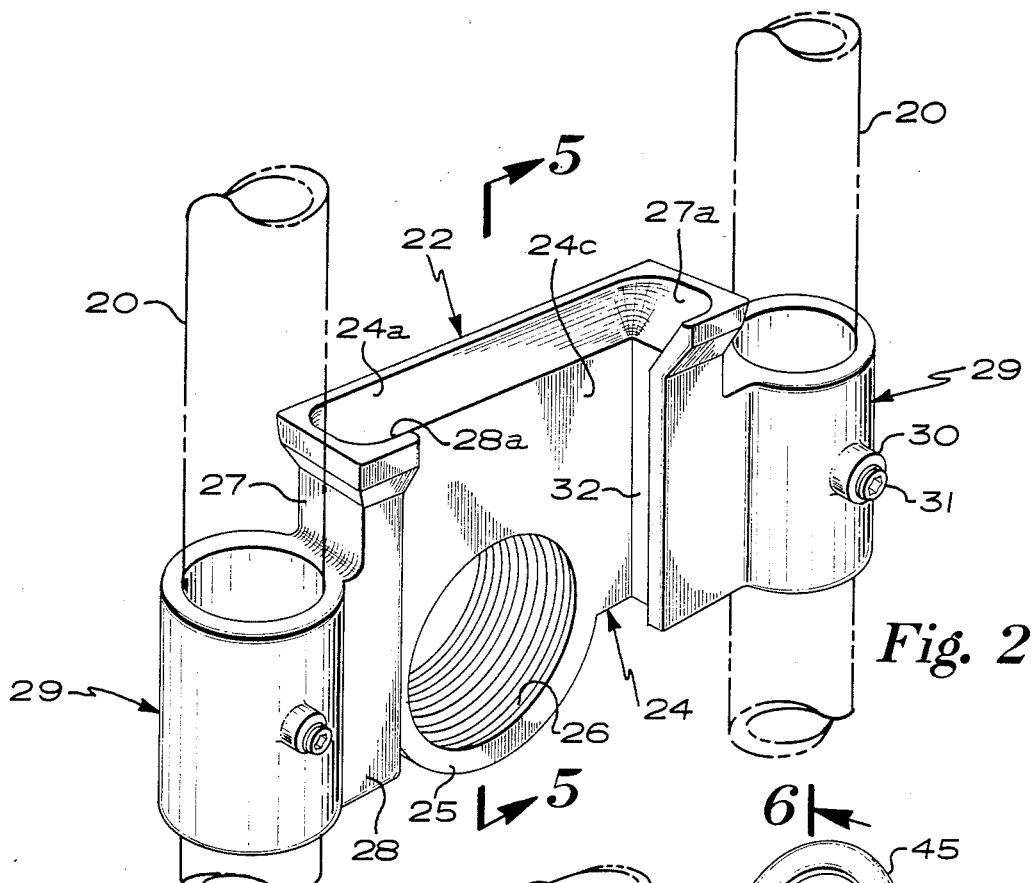
Fig. 2
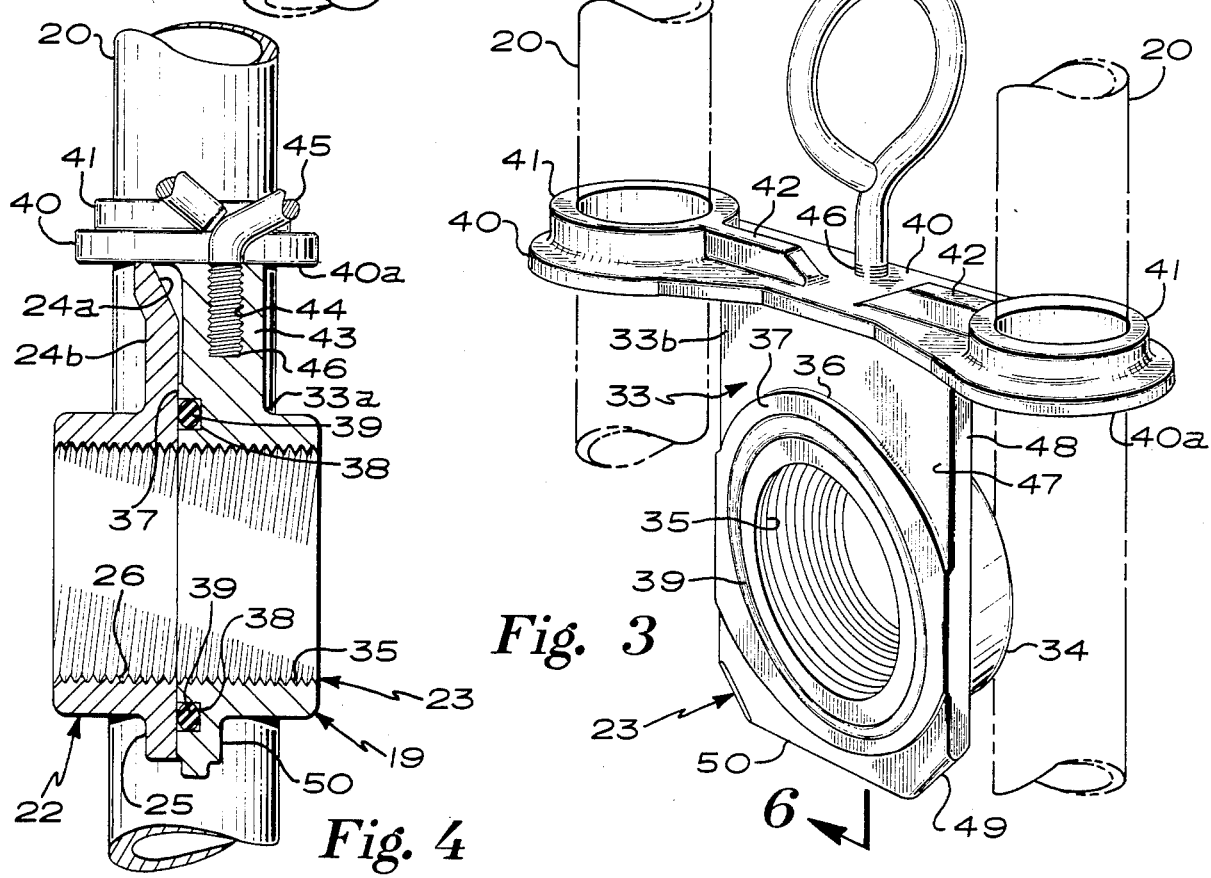
Fig. 3
Fig. 4

QUICK DISCONNECT COUPLING DEVICE

This invention is a continuation-in-part application of my co-pending application Ser. No. 547,328, filed Oct. 31, 1983, now abandoned, and entitled QUICK COUPLING FOR SUMP PUMP.

SUMMARY OF THE INVENTION

This invention relates to coupling devices and, more particularly, to quick disconnect coupling devices for use in coupling a sump pump to an outlet pipe.

Quick disconnect couplings and guide rails are used with sump pumps to permit the latter to be easily removed when the sump pump malfunctions or fails. In my co-pending Application, the quick disconnect coupling was formed of a chemically inert plastic material and was comprised of two substantially identical coupling elements which were typically used with relatively large sump pumps. The present coupling device is similar in construction, but is used with much smaller sump pumps.

It is therefore a general object of this invention to provide a novel and improved quick disconnect coupling, of simple and inexpensive construction, for use with the conventional standard commercial submersible pumps.

Another object of this invention is the provision of a quick disconnect coupling including a pair of coupling members formed of a non-corrosive material, one of which is threadedly connected to the sump pump outlet and the other being connected to the outlet pipe, the coupling members being disposed in mating sealed relation with each other by co-acting guide elements.

These and other objects of the invention are further defined in the following specification.

FIGURES OF THE DRAWING

FIG. 2 is a rear perspective view of one of the coupling members of the novel quick disconnect coupling;

FIG. 3 is a front perspective view of the other coupling member;

FIG. 4 is a cross-sectional view of the quick disconnect coupling members illustrated in coupled relation;

DESCRIPTION OF THE PREFERRED EMBODIMENT

Figure 1:
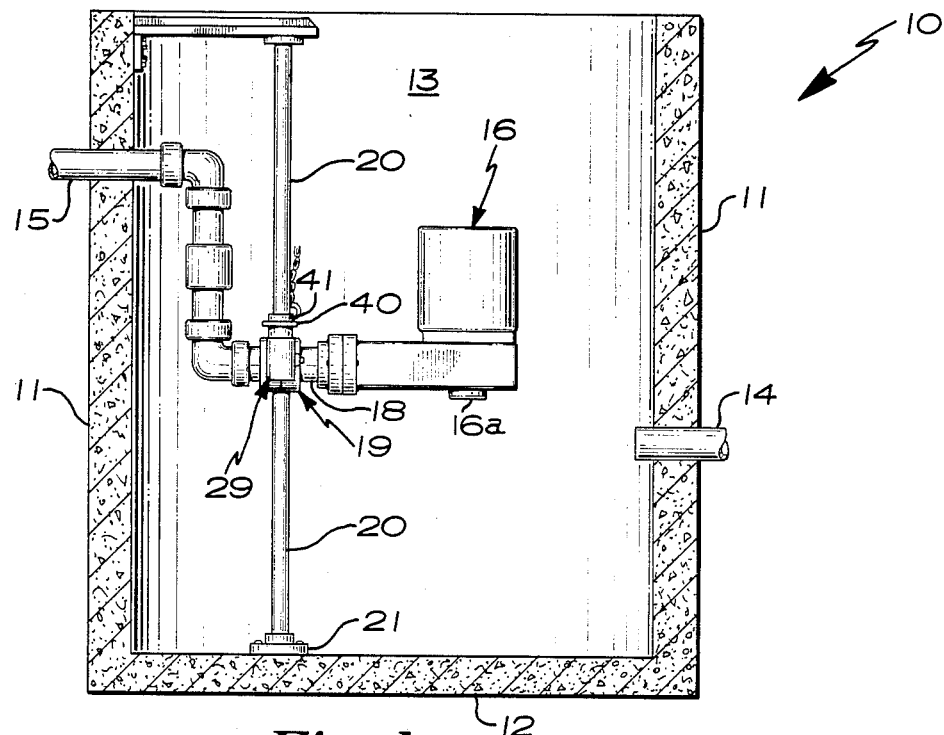
FIG. 1 is a cross-sectional view of a sump illustrating an immersible sump pump therein and incorporating the novel disconnect coupling and guide rail system.

Referring now to the drawings and, more particularly, to FIG. 1, it will be seen that the novel quick disconnect coupling and guide system is illustrated in cooperative relation with the submersible sump pump positioned in a sump 10. The sump 10 is of generally rectangular or cylindrical configuration and includes opposed vertical side walls 11 and a bottom wall 12 formed of masonry, which is typically used in residences and in some commercial establishments. Waste water containing sewage material is introduced into the interior 13 of the sump 10 by means of an inlet pipe 14. The waste water and the entrained waste material is discharged from the interior of the sump through an outlet pipe 15.

The outlet pipe 15 is connected in communicating relation to a conventional commercial sump pump 16, as best seen in FIG. 1. The sump pump 16 is provided with an intake 16a through which the waste water passes, and the waste water is discharged through a discharge outlet 18 which is connected to the quick disconnect coupling 19. The quick disconnect coupling 19 interconnects the discharge outlet of the sump pump with the outlet pipe 15.

In the embodiment shown, it will be noted that the quick disconnect coupling 19 is slidably connected with a pair of laterally spaced apart, vertically extended guide rails 20 which are formed of a suitable chemically inert plastic material, such as polyvinylchloride, stainless steel, or plated steel. In the embodiment shown, the guide rails actually comprise three-fourths inch polyvinylchloride pipes. The bottom ends of the guide rails 20 are each secured to one of a pair of pads 21 which are bolted to the floor or bottom wall 12 of the sump by suitable bolts. The guide rails 20 extend upwardly and exteriorly of the sump.

Figure 5:
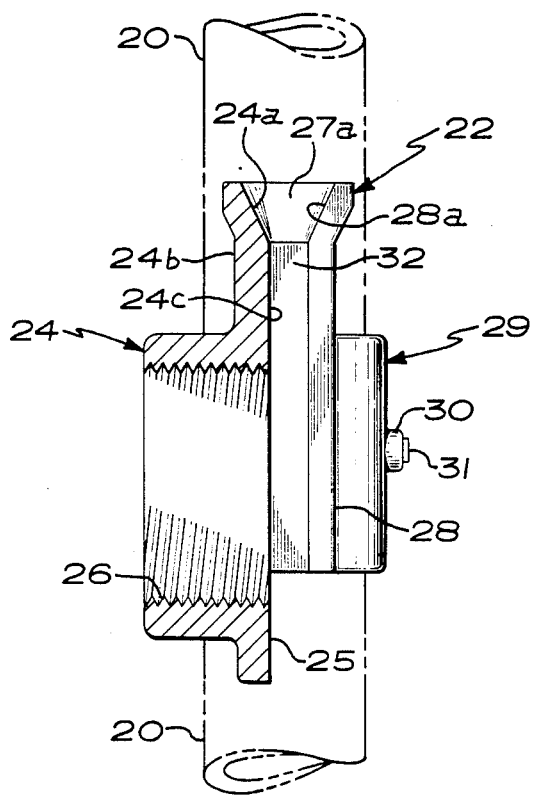
FIG. 5 is a cross-sectional view taken approximately along line 5—5 of FIG. 2 and looking in the direction of the arrows.
Figure 6:
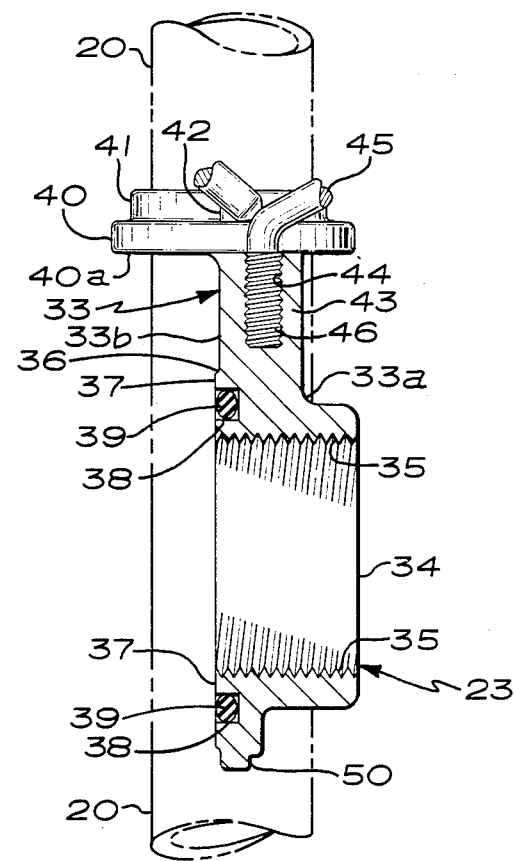
FIG. 6 is a cross-sectional view taken approximately along line 6—6 of FIG. 3 and looking in the direction of the arrows.

The quick disconnect coupling 19 is comprised of a coupling member 22 and a coupling member 23. In the embodiment shown, the coupling members 22 and 23, respectively, are formed of a brass alloy and are therefore substantially corrosive resistant to the normally corrosive materials contained in waste water. Referring now to FIGS. 2, 4, and 5, it will be seen that coupling member 22 includes a body 24 having a generally cylindrical coupling element 25 integrally formed therewith and projecting outwardly from the front surface 24b thereof. The cylindrical coupling element 25 is internally threaded, as at 26, for a threaded connection to the threaded end of the outlet pipe 15. The rear surface 24c of the body 24 defines a planar coupling face for engagement with a mating coupling face on the coupling member 23.

A pair of rearwardly projecting substantially parallel flanges 27 are integral with the body 24 of the coupling member 22 and project rearwardly from opposite edges thereof. Each flange 27 has an inturned terminal flange 28 integral therewith and projecting inwardly therefrom. It will be seen that the inturned flanges are disposed in substantially parallel relation with respect to the coupling face 24c of the body 24. The upper portion 24a of the body 24 flares upwardly and outwardly, as best seen in FIGS. 2 and 5. Similarly, the upper portion of each flange 28 flares upwardly and rearwardly.

Each flange 27 has a cylindrical vertically disposed rail engaging element 29 integral therewith and projecting outwardly therefrom. Each rail engaging element 29 is adapted to engage one of the rails 20 for sliding engagement therewith. Each cylindrical rail engaging element 29 is provided with a generally circular cylindrical embossed element 30 which is internally threaded and which communicates with the interior of the associated rail engaging element 29. Each internally threaded embossed element 30 accommodates a set screw 31 which may be tightened into engaging relation with one of the rails 20. This arrangement permits the coupling member 22 to be selectively positioned on the rails 20.

The flanges 27 and 28 on each side of the coupling member 22 cooperate with each other to define a vertically disposed guide way 32 for guiding the coupling member 23 into coupled and sealed relation with respect to the coupling 22. The coupling member 23 also includes a body 33 which has a generally cylindrical coupling element 34 integral therewith and projecting outwardly from the front surface 33a thereof. The coupling element 34 is internally threaded, as at 35, and threadedly engages the discharge outlet 18 of the sump pump 16. Referring now to FIGS. 3 and 4, it will be seen that the rear face 33b has an annular embossed element 36 projecting axially therefrom and this annular embossed element 36 defines an annular planar coupling face 37. The planar coupling face 37 has an annular groove 38 therein for accommodating an O-ring seal 39. Referring now to FIG. 4, it will be seen that when the coupling members 22 and 23 are disposed in coupling relation, the coupling face 37 is disposed in confronting relation with the coupling face 24c of the coupling member 22. The O-ring seal 39 will sealingly engage this face so that the coupling element 25 is disposed in sealed relation with the coupling element 34.

The coupling member 23 also includes a horizontal flange 40 which is integral with the upper edge portion of the body 33 and which is disposed substantially normal to the general plane of the body 33. The flange 40 has a pair of cylindrical rail engaging elements 41 integral therewith and projecting upwardly from the upper surface thereof adjacent the outer ends thereof. The rail engaging elements 41 also engage the guide rails 20 to permit vertical movement of the coupling member 23 and the sump pump connected to the coupling element 34 thereof. The lower surface of the rail engaging elements 41 is substantially coplanar with the lower surface of the flange 40.

Suitable reinforcing ribs 42 project upwardly from the flange 40 and extend to and are integral with the rail engaging elements 41. The rear surface 33b of the body 33 is provided with a vertically disposed embossed element 43 which has a threaded opening 44 therein. The threaded opening 44 therein is adapted to engage an eye bolt 45 having a threaded shank 46, as best seen in FIG. 3. The eye bolt may be connected to a chain C or rope which extends out of the sump when the quick disconnect coupling 19 is connected in coupling relation with a sump pump. With this arrangement, the chain C connected to the eye bolt 45 may be used to raise the coupling member 23 and associated sump pump along the rails 20 to permit the sump pump to be repaired or replaced.

Referring again to FIG. 3, it will be seen that the vertical edge portions of the body 33 define a pair of vertical guide elements 47 having substantially straight smooth vertical edges 48. The guide elements 47 are adapted to move to the guide ways when the coupling member 23 is urged into coupling relation with respect to the coupling member 22. In this regard, the vertical edges 48 will engage the inner surfaces of the flanges 27. In order to facilitate vertical sliding movement of the coupling member 23 relative to the coupling member 22, the lower portions 49 of the guide elements 47 are beveled downwardly and inwardly. It will also be noted that the lower edge portion of the body 33 is also beveled downwardly, as at 50. With this arrangement, the vertical guide elements 47 of the coupling member 23 may be readily moved into sliding relation in respect to the coupling member 22.

In use, the quick disconnect coupling 19 will be disposed in coupling relation with respect to the sump pump 16 and the outlet pipe 15. The coupling member 22 will be selectively positioned on the rails 20 at the desired elevation, and the set screws 31 will have been tightened to retain the coupling member in this particular position. The coupling member 23 will have the sump pump attached to the cylindrical coupling element 34 and the rail engaging elements 41 will also engage the rails 20. The coupling member 23 will be urged downwardly so that the guide elements 41 engage in and are guided by the guide ways 32. During this coupling action, the coupling member 23 will be moved downwardly until the lower surface of the flange 40 engages the upper edge of the body 24 and the upper edges of flanges 27 and 28. When in this position, the coupling element 34 will be disposed in registering relation with the coupling element 25. Referring now to FIG. 4, it will be seen that the O-ring seal 39 will sealingly engage the coupling face 24 adjacent the opening defined by the cylindrical element 25. An effective fluid seal will be formed by the O-ring 39.

The coaction of the guide elements 47 within the guide ways 32 provides a tight pressed coupling arrangement which can only be coupled by raising the coupling member 23 relative to the coupling member 22. In the event that the sump pump 16 fails or must be removed for maintenance, the user will merely pull on the rope or chain C thereby causing the coupling member 23 to be moved vertically along the rails 20 and along the guide ways 32. The pump may then be removed from coupled relation with the coupling member 23 and replaced by the user.

When the sump pump 16 is repaired or replaced, and it is then necessary to recouple the sump pump to the outlet pipe, the sump pump is first connected to the coupling element 34 of the coupling member 23, and the user then lowers the coupling member 23 along the rails 20 until the flange 40 engages the upper peripheral edges defined by the body 24, flanges 27, and flanges 28.

It will therefore be seen that the quick disconnect coupling 19 permits ready removal and replacement of a sump pump by a user with a minimum of effort by merely raising and lowering one coupling member relative to another coupling member.

It is pointed out that the rail engaging elements on each coupling member may be omitted when the coupling device is used in a shallow sump. The model of the quick disconnect coupling will be connected to the sump pump and outlet pipe, as previously described, but will have no rail engaging elements because no guide rails are used in shallow sumps. The user may disconnect the coupling member connected to the sump pump by merely reaching into the sump and manually removing the coupling member.

Thus, it will be seen that I have provided a novel quick disconnect coupling for sump pumps and the like, which is not only of simple and inexpensive construction, but one which functions in a more efficient manner than any heretofore known comparable coupling.

What is claimed is:

1. A quick disconnect coupling device for coupling the discharge outlet of a sump pump with the outlet pipe through which waste water is discharged, the sump pump being positioned in a sump and having an intake through which waste water from the sump inlet is directed, said device comprising:

a pair of vertically disposed coupling members formed of a chemically inert metallic material and each including a vertically disposed body and a cylindrical internally threaded coupling element integral with said body and extending horizontally therefrom, the cylindrical coupling element on one coupling member being connected in communicating relation with the discharge outlet of the sump pump and the cylindrical coupling element of the other coupling member being connected in communication relation with the outlet pipe, one of said coupling members including means integral with said body and defining a pair of vertical guide ways adjacent the marginal portions of said body of said one coupling member, the other of said coupling members having vertical guide elements integral with the body thereof adjacent the marginal portions of the latter and engaging said guide ways to couple the coupling members together so that the coupling elements thereof are in registering relation with each other, the body of said other coupling member having a horizontal flange on the upper portion thereof engaging the upper portion of the body of said one coupling member when said coupling member is in coupled relation to position said coupling in registering relation with each other, a pair of laterally spaced apart, substantially parallel vertical guide rails in the sump and extending upwardly therefrom, one coupling member having a pair of cylindrical rail engaging elements integral therewith adjacent opposite sides of the body thereof, the other coupling member having a pair of rail engaging elements integral with the horizontal flange thereof, said rail engaging elements of each coupling member engaging the guide rails to guide the associated coupling member during vertical movement of the latter.

2. The quick disconnect coupling device as defined in claim 1 and retaining means on the rail engaging elements of said one coupling member for releasably locking the latter in a selected position along the guide rails.

3. The quick disconnect coupling device as defined in claim 1 wherein the vertical guide elements on said other coupling member comprises the vertical side edge portions of the associated body.

4. The quick disconnect coupling device as defined in claim 1 wherein said guide ways on said one coupling member comprises a pair of L-shaped flanges each being integral with one side portion of the associated body.

5. The quick disconnect coupling device as defined in claim 3 wherein the body of said other coupling member is tapered downwardly at the lower portion thereof.

* * * * *